(12) United States Patent
Hitakatsu et al.

(10) Patent No.: US 11,958,493 B2
(45) Date of Patent: Apr. 16, 2024

(54) VEHICLE CONTROL DEVICE AND VEHICLE CONTROL METHOD

(71) Applicant: HONDA MOTOR CO., LTD., Tokyo (JP)

(72) Inventors: Sho Hitakatsu, Wako (JP); Toshikazu Suwa, Tokyo (JP); Masaki Nakajima, Yokohama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/036,419

(22) PCT Filed: Dec. 28, 2020

(86) PCT No.: PCT/JP2020/049098
§ 371 (c)(1),
(2) Date: May 11, 2023

(87) PCT Pub. No.: WO2022/144956
PCT Pub. Date: Jul. 7, 2022

(65) Prior Publication Data
US 2023/0322246 A1    Oct. 12, 2023

(51) Int. Cl.
*B60W 50/08* (2020.01)
*B60W 60/00* (2020.01)

(52) U.S. Cl.
CPC ........ *B60W 50/082* (2013.01); *B60W 60/005* (2020.02); *B60W 2555/60* (2020.02); *B60W 2556/40* (2020.02); *B60W 2710/20* (2013.01); *B60W 2720/106* (2013.01)

(58) Field of Classification Search
None
See application file for complete search history.

(56) References Cited

U.S. PATENT DOCUMENTS 9,483,059 B2 *  11/2016  Caveney .......... B60W 60/0053
11,144,053 B2 *  10/2021  Urano .............. B60W 60/0053
(Continued)

FOREIGN PATENT DOCUMENTS

| CN | 106976457 | 7/2017 |
| CN | 111361552 | 7/2020 |

(Continued)

OTHER PUBLICATIONS

International Search Report and Written Opinion for International Application No. PCT/JP2020/049098 dated Mar. 23, 2021, 11 pages.

(Continued)

*Primary Examiner* — James J Lee
*Assistant Examiner* — David Hatch
(74) *Attorney, Agent, or Firm* — Amin, Turocy & Watson, LLP (57) ABSTRACT

A vehicle control device includes a recognizer configured to recognize a surrounding situation of a vehicle, a driving controller configured to control steering and acceleration/deceleration of the vehicle independently of an operation of a driver of the vehicle; and a mode decider configured to decide on any one of a plurality of driving modes including a first driving mode and a second driving mode as a driving mode of the vehicle. The recognizer recognizes a sign existing within a reference range of a route along which the vehicle travels. The mode decider changes the driving mode of the vehicle from the second driving mode to the first driving mode when the driving mode of the vehicle is the second driving mode and when the number of signs recognized by the recognizer exceeds a first reference value.

8 Claims, 6 Drawing Sheets

(56) References Cited

U.S. PATENT DOCUMENTS

| | | | |
|---|---|---|---|
| 11,619,516 B2* | 4/2023 | Yang | G01C 21/3658 701/26 |
| 2015/0105937 A1 | 4/2015 | Waldbauer et al. | |
| 2017/0205823 A1 | 7/2017 | Arndt et al. | |
| 2018/0348755 A1 | 12/2018 | Yamaguchi et al. | |
| 2019/0025825 A1 | 1/2019 | Takahama | |
| 2020/0180657 A1 | 6/2020 | Iwamoto et al. | |
| 2020/0182631 A1 | 6/2020 | Yang et al. | |
| 2020/0319635 A1* | 10/2020 | Andres | B60W 60/0053 |
| 2020/0319636 A1 | 10/2020 | Urano et al. | |
| 2022/0185266 A1* | 6/2022 | Shah | B60W 30/0956 |

FOREIGN PATENT DOCUMENTS

| | | |
|---|---|---|
| DE | 102016200513 A1 | 7/2017 |
| EP | 3373268 | 9/2018 |
| JP | 2003-168123 | 6/2003 |
| JP | 2006-275690 | 10/2006 |
| JP | 2013-095330 | 5/2013 |
| JP | 2015-519642 | 7/2015 |
| JP | 2017-041038 | 2/2017 |
| JP | 2017-132290 | 8/2017 |
| JP | 2018-189594 | 11/2018 |
| JP | 2018-206358 | 12/2018 |
| JP | 2020-019455 | 2/2020 |
| JP | 2020-158008 | 10/2020 |

OTHER PUBLICATIONS

Chinese Office Action for Chinese Patent Application No. 202080106055.4 dated Sep. 13, 2023.
German Office Action for German Patent Application No. 112020007586.9 mailed Jan. 8, 2024.

* cited by examiner

VEHICLE CONTROL DEVICE AND VEHICLE CONTROL METHOD

TECHNICAL FIELD

The present invention relates to a vehicle control device, a vehicle control method, and a program.

BACKGROUND ART

In the related art, the invention of an in-vehicle system including: a storage determination processor configured to iteratively determine the presence or absence of highly accurate map information with respect to a road on which a host vehicle travels; a storage information acquisition processor configured to acquire information indicating iterated determination results; and an automated driving propriety notifier configured to provide a notification of the information acquired by the storage information acquisition processor has been disclosed (Patent Document 1).

CITATION LIST

Patent Document

[Patent Document 1]
Japanese Unexamined Patent Application, First Publication No. 2018-189594

SUMMARY OF INVENTION

Technical Problem

Although information stored in a map is used to provide an automated driving propriety notification mechanically in the conventional technology, the actual traffic situation is more complicated and it may be difficult to perform appropriate control according to a road structure.

The present invention has been made in consideration of such circumstances and an objective of the present invention is to provide a vehicle control device, a vehicle control method, and a program capable of performing appropriate control according to a road structure.

Solution to Problem

A vehicle control device, a vehicle control method, and a program according to the present invention adopt the following configurations.

(1): According to an aspect of the present invention, there is provided a vehicle control device including: a recognizer configured to recognize a surrounding situation of a vehicle; a driving controller configured to control steering and acceleration/deceleration of the vehicle independently of an operation of a driver of the vehicle; and a mode decider configured to decide on any one of a plurality of driving modes including a first driving mode and a second driving mode as a driving mode of the vehicle and change the driving mode of the vehicle to a driving mode in which a task is severer when a task associated with the decided driving mode is not executed by the driver, the second driving mode being a driving mode in which a task imposed on the driver is milder than that in the first driving mode, some of the plurality of driving modes including at least the second driving mode being controlled by the driving controller, wherein the recognizer recognizes a sign existing within a reference range of a route along which the vehicle travels, and wherein the mode decider changes the driving mode of the vehicle from the second driving mode to the first driving mode when the driving mode of the vehicle is the second driving mode and when the number of signs recognized by the recognizer exceeds a first reference value.

(2): In the above-described aspect (1), the mode decider changes the driving mode in the driving controller from the second driving mode to the first driving mode when a difference degree between the number of signs recognized by the recognizer and the number of signs installed in a lane on a map within the reference range indicated in high-precision map information does not satisfy a condition.

(3): In the above-described aspect (2), the mode decider causes a high-precision map information acquirer to acquire new high-precision map information when the difference degree associated with the number of signs does not satisfy the condition.

(4): In the above-described aspect (1), the mode decider updates the first reference value when high-precision map information including at least information of the position of a sign installed in a lane on a map has been updated.

(5): In the above-described aspect (1), the reference range includes a range from the vehicle to a forward reference distance in a forward direction and a range from the vehicle to a rearward reference distance in a rearward direction.

(6): In the above-described aspect (5), the forward reference distance is longer than the rearward reference distance.

(7): In the above-described aspect (1), the recognizer recognizes a sign installed at a position higher than a road surface of the route and/or a sign drawn on the road surface.

(8): In the above-described aspect (1), the second driving mode is a driving mode in which at least a task of gripping an operation element for receiving a steering operation is not imposed on the driver, and the first driving mode is a driving mode in which a driving operation by the driver is required in relation to at least one of the steering and the acceleration/deceleration of the vehicle or a driving mode in which the task of gripping the operation element is imposed on the driver.

(9): According to an aspect of the present invention, there is provided a vehicle control method including: recognizing, by a computer mounted in a vehicle, a surrounding situation of the vehicle; controlling, by the computer, steering and acceleration/deceleration of the vehicle independently of an operation of a driver of the vehicle; deciding, by the computer, on any one of a plurality of driving modes including a first driving mode and a second driving mode as a driving mode of the vehicle, the second driving mode being a driving mode in which a task imposed on the driver is milder than that in the first driving mode, some of the plurality of driving modes including at least the second driving mode being performed by controlling the steering and the acceleration/deceleration of the vehicle independently of the operation of the driver of the vehicle; changing, by the computer, the driving mode of the vehicle to a driving mode in which a task is severer when a task associated with the decided driving mode is not executed by the driver; recognizing, by the computer, a sign existing within a reference range of a route along which the vehicle travels at the time of recognition; and changing, by the computer, the driving mode of the vehicle from the second driving mode to the first driving mode when the driving mode of the vehicle is the second driving mode and when the number of recognized signs exceeds a first reference value.

(10): According to an aspect of the present invention, there is provided a program for causing a computer mounted in a vehicle to: recognize a surrounding situation of the vehicle; control steering and acceleration/deceleration of the vehicle independently of an operation of a driver of the vehicle; decide on any one of a plurality of driving modes including a first driving mode and a second driving mode as a driving mode of the vehicle, the second driving mode being a driving mode in which a task imposed on the driver is milder than that in the first driving mode, some of the plurality of driving modes including at least the second driving mode being performed by controlling the steering and the acceleration/deceleration of the vehicle independently of the operation of the driver of the vehicle; change the driving mode of the vehicle to a driving mode in which a task is severer when a task associated with the decided driving mode is not executed by the driver; recognize a sign existing within a reference range of a route along which the vehicle travels at the time of recognition; and change the driving mode of the vehicle from the second driving mode to the first driving mode when the driving mode of the vehicle is the second driving mode and when the number of recognized signs exceeds a first reference value.

Advantageous Effects of Invention

According to the above-described aspects (1) to (10), it is possible to perform appropriate control according to a road structure.

DESCRIPTION OF EMBODIMENTS

Hereinafter, embodiments of a vehicle control device, a vehicle control method, and a program of the present invention will be described with reference to the drawings.

[Overall Configuration]

Figure 1:
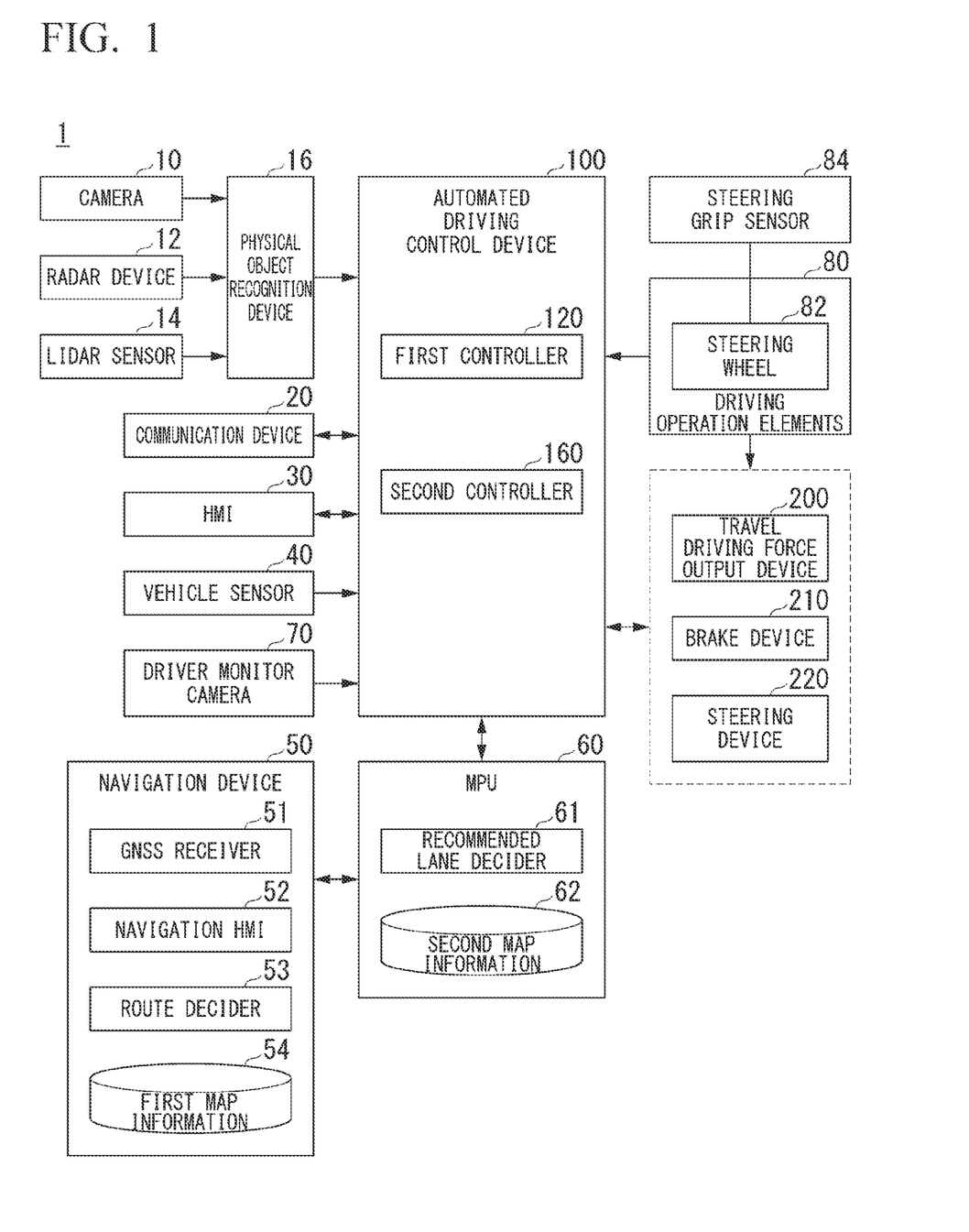
FIG. 1 is a configuration diagram of a vehicle system using a vehicle control device according to an embodiment.

FIG. 1 is a configuration diagram of a vehicle system 1 using a vehicle control device. A vehicle equipped with the vehicle system 1 is, for example, a vehicle such as a two-wheeled vehicle, a three-wheeled vehicle, or a four-wheeled vehicle. A driving source of these vehicles is an internal combustion engine such as a diesel engine or a gasoline engine, an electric motor, or a combination thereof. The electric motor operates using electric power generated by a power generator connected to the internal combustion engine or power that is supplied when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, a driver monitor camera 70, driving operation elements 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added.

For example, the camera 10 is a digital camera using a solid-state imaging element such as a charge coupled device (CCD) or a complementary metal oxide semiconductor (CMOS). The camera 10 is attached to any position on the vehicle (hereinafter, a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any position on the host vehicle M. The radar device 12 may detect the position and the speed of the physical object in a frequency modulated continuous wave (FM-CW) scheme.

The LIDAR sensor 14 radiates light (or electromagnetic waves of a wavelength close to an optical wavelength) to the vicinity of the host vehicle M and measures scattered light. The LIDAR sensor 14 detects a distance to an object on the basis of a time period from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize the position, the type, the speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle in the vicinity of the host vehicle M using, for example, a cellular network, a Wi-Fi network, Bluetooth (registered trademark), dedicated short range communication (DSRC), or the like, or communicates with various types of server devices via a radio base station.

The HMI 30 provides an occupant of the host vehicle M with various types of information and receives an input operation by the occupant. The HMI 30 includes various types of display devices, a speaker, a buzzer, a touch panel, a switch, a key, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like.

For example, the navigation device 50 includes a global navigation satellite system (GNSS) receiver 51, a navigation HMI 52, and a route decider 53. The navigation device 50 stores first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decider 53 decides on a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The route on the map is output to the MPU 60. The navigation device 50 may perform route guidance using the navigation HMI 52 based on the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decider 61 and stores second map information 62 in a storage device such as an HDD or a flash memory. The recommended lane decider 61 divides the route on the map provided from the navigation device 50 into a plurality of blocks (for example, divides the route every 100 [m] in a traveling direction of the vehicle), and determines a recommended lane for each block with reference to the second map information 62. The recommended lane decider 61 determines what number lane the vehicle travels in from the left. The recommended lane decider 61 decides on the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, information of an inhibition section in which mode A or B to be described below is inhibited, and the like. The second map information 62 may be updated at any time when the communication device 20 communicates with another device.

The driver monitor camera 70 is, for example, a digital camera that uses a solid-state image sensor such as a CCD or a CMOS. The driver monitor camera 70 is attached to any location on the host vehicle M at a position in a direction in which the head of an occupant (hereinafter referred to as a driver) sitting in the driver's seat of the host vehicle M can be imaged from the front (in a direction in which his/her face is imaged). For example, the driver monitor camera 70 is attached to an upper part of a display device provided on the central portion of an instrument panel of the host vehicle M.

The driving operation elements 80 include, for example, an accelerator pedal, a brake pedal, a shift lever, and other operation elements in addition to the steering wheel 82. A sensor for detecting an amount of operation or the presence or absence of an operation is attached to the driving operation element 80 and a detection result is output to the automated driving control device 100 or some or all of the travel driving force output device 200, the brake device 210, and the steering device 220. The steering wheel 82 is an example of an "operation element for receiving a steering operation by the driver." The operation element does not necessarily have to be annular and may be in the form of a variant steering wheel, a joystick, a button, or the like. A steering grip sensor 84 is attached to the steering wheel 82. The steering grip sensor 84 is implemented by a capacitance sensor or the like and outputs a signal for detecting whether or not the driver is gripping the steering wheel 82 (indicating that the driver is in contact with the steering wheel 82 in a state in which a force is applied) to the automated driving control device 100.

The automated driving control device 100 includes, for example, a first controller 120 and a second controller 160. Each of the first controller 120 and the second controller 160 is implemented, for example, by a hardware processor such as a central processing unit (CPU) executing a program (software). Some or all of the above components may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be prestored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device. The automated driving control device 100 is an example of a "vehicle control device." A combination of the action plan generator 140 and the second controller 160 is an example of a "driving controller."

Figure 2:
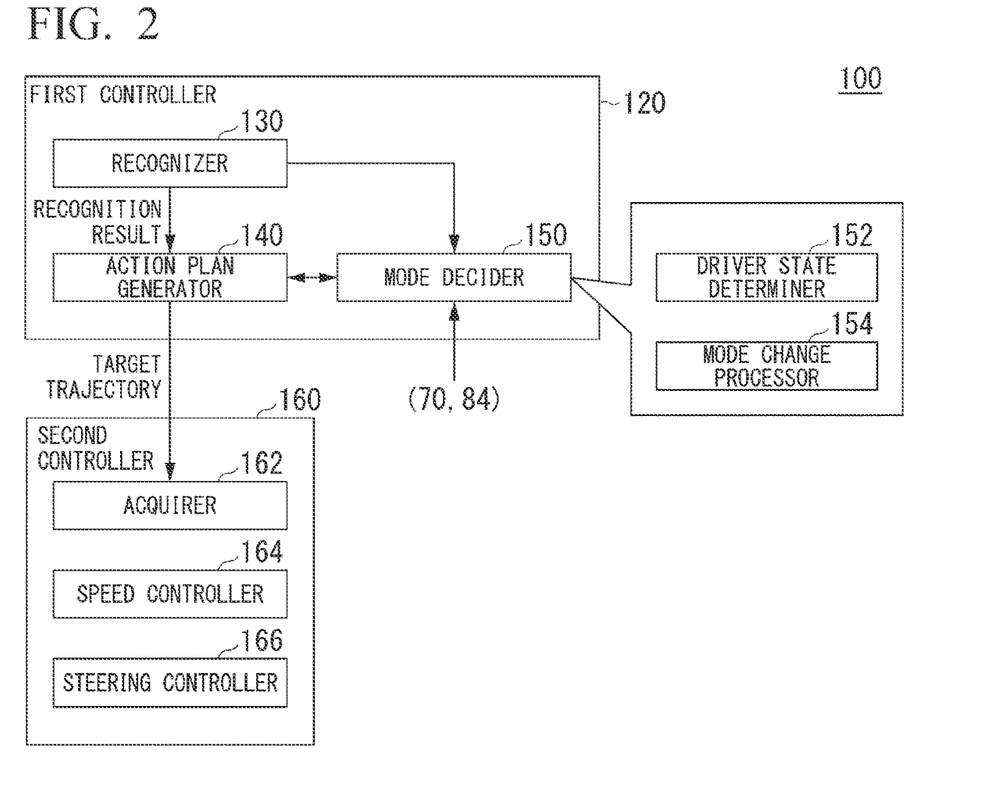
FIG. 2 is a functional configuration diagram of a first controller and a second controller.

FIG. 2 is a functional configuration diagram of the first controller 120 and the second controller 160. The first controller 120 includes, for example, a recognizer 130, the action plan generator 140, and a mode decider 150. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both the recognitions. Thereby, the reliability of automated driving is secured.

The recognizer 130 recognizes states of positions, speeds, acceleration, and the like of physical objects near the host vehicle M on the basis of information input from the camera 10, the radar device 12, and the LIDAR sensor 14 via the physical object recognition device 16. For example, the position of the physical object is recognized as the position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented area. The "state" of a physical object may include acceleration or jerk of the physical object or an "action state" (for example, whether or not a lane change is being made or intended).

For example, the recognizer 130 recognizes a lane in which the host vehicle M is traveling (a traveling lane). For example, the recognizer 130 recognizes the traveling lane by comparing a pattern of a road marking line (for example, an arrangement of solid lines and broken lines) obtained from the second map information 62 with a pattern of road markings in the vicinity of the host vehicle M recognized from an image captured by the camera 10. The recognizer 130 may recognize the traveling lane by recognizing a traveling path boundary (a road boundary) including a road marking, a road shoulder, a curb stone, a median strip, a guardrail, or the like as well as a road marking. In this recognition, the position of the host vehicle M acquired from the navigation device 50 or a processing result of the INS may be added. The recognizer 130 may recognize a temporary stop line, an obstacle, red traffic light, a toll gate, and other road events.

When the traveling lane is recognized, the recognizer 130 recognizes the position or orientation of the host vehicle M with respect to the traveling lane. For example, the recognizer 130 may recognize a gap of a reference point of the host vehicle M from the center of the lane and an angle formed with respect to a line connected to the center of the lane in a traveling direction of the host vehicle M as a relative position and orientation of the host vehicle M related to the traveling lane. Alternatively, the recognizer 130 may recognize the position of the reference point of the host vehicle M related to one side end portion (a road marking or a road boundary) of the traveling lane or the like as a relative position of the host vehicle M related to the traveling lane.

The recognizer 130 recognizes a sign installed on a nearby road including a route along which the host vehicle M travels. The recognizer 130 recognizes a mark drawn on the road surface as the sign in addition to a sign installed at a position higher than the road surface on a road side such as a road shoulder, above the road, or the like. In addition to a sign installed in a traveling lane, the recognizer 130 may recognize, for example, a sign installed in a lane (hereinafter referred to as a main lane) in which traveling is possible in a direction that is the same as a traveling direction of a traveling lane, a lane (hereinafter referred to as a branch lane) that branches off from the traveling lane or the main lane, or a lane (hereinafter referred to as a merging lane) that merges with the traveling lane or the main lane. The recognizer 130 recognizes each of a sign in a direction that is the same as the traveling direction of the host vehicle M, i.e., in front of the host vehicle M, and a sign in the rear where the host vehicle M has traveled.

The action plan generator 140 generates a future target trajectory along which the host vehicle M automatically travels (independently of the driver's operation) so that the host vehicle M can generally travel in the recommended lane decided on by the recommended lane decider 61 and further cope with a surrounding situation of the host vehicle M. For example, the target trajectory includes a speed element. For example, the target trajectory is represented by sequentially arranging points (trajectory points) at which the host vehicle M is required to arrive. The trajectory points are points at which the host vehicle M is required to arrive for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the host vehicle M is required to arrive at the sampling time for each prescribed sampling time. In this case, information about the target speed or the target acceleration is represented by an interval between the trajectory points.

The action plan generator 140 may set an automated driving event when a target trajectory is generated. Automated driving events include a constant-speed traveling event, a low-speed tracking event, a lane change event, a branch-point-related movement event, a merge-point-related movement event, a takeover event, and the like. The action plan generator 140 generates a target trajectory according to an activated event.

The mode decider 150 decides on any one of a plurality of driving modes in which tasks imposed on the driver are different as the driving mode of the host vehicle M. The mode decider 150 includes, for example, a driver state determiner 152, and a mode change processor 154. These individual functions will be described below.

Figure 3:
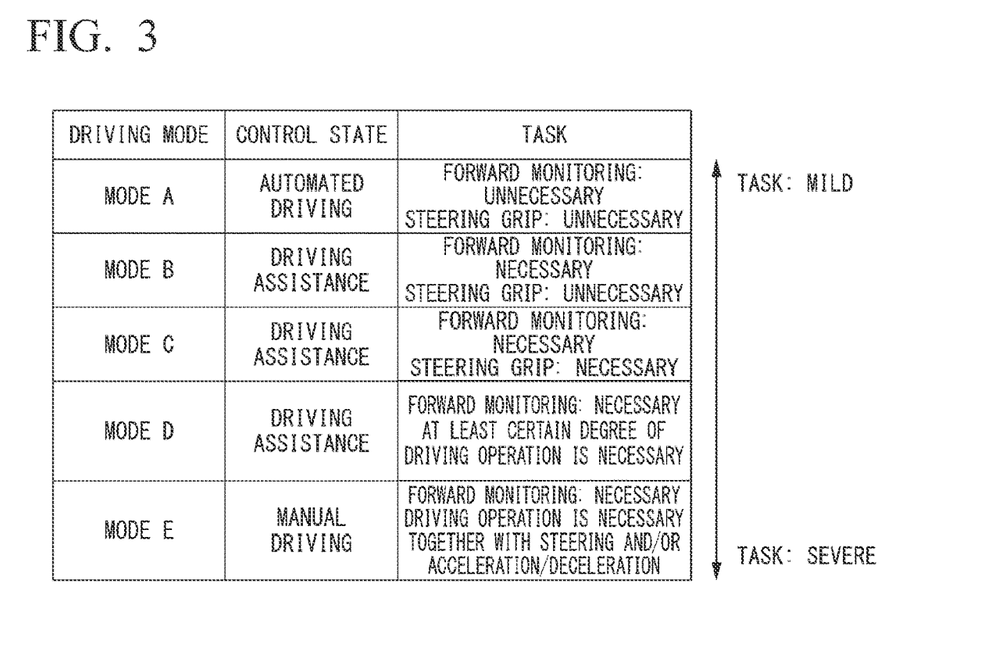
FIG. 3 is a diagram showing an example of corresponding relationships between a driving mode, a control state of a host vehicle, and a task.

FIG. 3 is a diagram showing an example of corresponding relationships between the driving mode, the control state of the host vehicle M, and the task. The driving modes of the host vehicle M include, for example, five modes from mode A to mode E. A degree of automation of the control state, i.e., the driving control of the host vehicle M, is highest in mode A, decreases in the order of mode B, mode C, and mode D, and is lowest in mode E. In contrast, the task imposed on the driver is mildest in mode A, becomes severer in the order of mode B, mode C, and mode D, and is severest in mode E. In modes D and E, because the control state is not automated driving, the automated driving control device 100 is responsible for ending the control related to automated driving and performing the shift to driving assistance or manual driving. Hereinafter, content of each driving mode is an exemplary example.

In mode A, the state is an automated driving state and neither forward monitoring nor gripping of the steering wheel 82 (steering grip in FIG. 3) is imposed on the driver. However, even in mode A, the driver is required to be in a posture where the fast shift to manual driving is enabled in response to a request from the system centered on the automated driving control device 100. The term "automated driving" as used herein indicates that both steering and acceleration/deceleration are controlled independently of the operation of the driver. The term "forward or front" indicates a space in a traveling direction of the host vehicle M that is visually recognized through the front windshield. Mode A is a driving mode in which the host vehicle M travels at a prescribed speed (for example, about 50 [km/h]) or less on a motorway such as an expressway and which can be executed when a condition in which there is a tracking target preceding vehicle or the like is satisfied. Mode A may be referred to as a traffic jam pilot (TJP). When this condition is no longer satisfied, the mode decider 150 changes the driving mode of the host vehicle M to mode B.

In mode B, the state is a driving assistance state and a task of monitoring a forward direction of the host vehicle M (hereinafter referred to as forward monitoring) is imposed on the driver, but a task of gripping the steering wheel 82 is not imposed on the driver. In mode C, the state is a driving assistance state and a forward monitoring task and a task of gripping the steering wheel 82 are imposed on the driver. Mode D is a driving mode in which a certain degree of driving operation by the driver is required for at least one of steering and acceleration/deceleration of the host vehicle M. For example, in mode D, driving assistance such as adaptive cruise control (ACC) or lane keeping assist system (LKAS) is provided. In mode E, both steering and acceleration/deceleration are in a state of manual driving that requires a driving operation by the driver. In both mode D and mode E, a task of monitoring a forward direction of the host vehicle M is naturally imposed on the driver.

The automated driving control device 100 (and a driving assistance device (not shown)) executes an automated lane change according to the driving mode. Automated lane changes include an automated lane change (1) due to a system request and an automated lane change (2) due to a driver request. The automated lane change (1) is an automated lane change for overtaking and an automated lane change for traveling toward a destination (an automated lane change based on a change in a recommended lane) performed when the speed of the preceding vehicle is at least a reference level less than the speed of the host vehicle. In the automated lane change (2), if a condition related to the speed, a positional relationship with a nearby vehicle, or the like is satisfied, the host vehicle M is allowed to change the lane in an operation direction when a direction indicator has been operated by the driver.

The automated driving control device 100 does not execute either the automated lane change (1) or (2) in mode A. The automated driving control device 100 executes both the automated lane changes (1) and (2) in modes B and C. The driving assistance device (not shown) does not execute the automated lane change (1) but executes the automated lane change (2) in mode D. In mode E, neither the automated lane change (1) nor (2) is executed.

The mode decider 150 changes the driving mode of the host vehicle M to a driving mode in which the task is severer when the task associated with the determined driving mode (hereinafter, the present driving mode) is not executed by the driver.

For example, in mode A, when the driver is in a posture where he/she cannot shift the driving to manual driving in response to a request from the system (for example, when he/she continues to look outside an allowable area or when a sign that driving becomes difficult is detected), the mode decider 150 performs control for prompting the driver to shift the driving to manual driving using the HMI 30, causing the host vehicle M to be gradually stopped close to the road shoulder when the driver does not respond, and stopping the automated driving. After the automated driving is stopped, the host vehicle is in mode D or E and the host vehicle M can be started according to the manual driving of the driver. Hereinafter, the same is true for "stopping of automated driving." When the driver is not performing forward monitoring in mode B, the mode decider 150 performs control for prompting the driver to perform forward monitoring using the HMI 30, causing the host vehicle M to be gradually stopped close to the road shoulder when the driver does not respond, and stopping the automated driving. When the driver is not performing forward monitoring in mode C or is not gripping the steering wheel 82, the mode decider 150 performs control for prompting the driver to perform the forward monitoring and/or grip the steering wheel 82 using the HMI 30, causing the host vehicle M to be gradually stopped close to the road shoulder when the driver does not respond, and stopping the automated driving.

The driver state determiner 152 monitors the driver's state for the above mode change and determines whether or not the driver's state is a state according to the task. For example, the driver state determiner 152 analyzes an image captured by the driver monitor camera 70 to perform an orientation estimation process and determines whether or not the driver is in a posture where he/she cannot shift the driving to manual driving in response to a request from the system. The driver state determiner 152 analyzes an image captured by the driver monitor camera 70 to perform a line-of-sight estimation process and determines whether or not the driver is performing forward monitoring.

The mode change processor 154 performs various types of processes for changing the mode. For example, the mode change processor 154 instructs the action plan generator 140 to generate a target trajectory for stopping the vehicle at the road shoulder, gives an operation instruction to a driving assistance device (not shown), or controls the HMI 30 so that the driver is prompted to take an action.

The second controller 160 controls the travel driving force output device 200, the brake device 210, and the steering device 220 so that the host vehicle M passes along the target trajectory generated by the action plan generator 140 at the scheduled times.

Returning to FIG. 2, the second controller 160 includes, for example, an acquirer 162, a speed controller 164, and a steering controller 166. The acquirer 162 acquires information of a target trajectory (trajectory points) generated by the action plan generator 140 and causes a memory (not shown) to store the information. The speed controller 164 controls the travel driving force output device 200 or the brake device 210 on the basis of a speed element associated with the target trajectory stored in the memory. The steering controller 166 controls the steering device 220 in accordance with a degree of bending of the target trajectory stored in the memory. The processes of the speed controller 164 and the steering controller 166 are implemented by, for example, a combination of feedforward control and feedback control. As an example, the steering controller 166 executes a combination of feedforward control according to the curvature of the road in front of the host vehicle M and feedback control based on a deviation from the target trajectory.

The travel driving force output device 200 outputs a travel driving force (torque) for enabling the vehicle to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operation element 80 so that brake torque according to a braking operation is output to each wheel. The brake device 210 may include a mechanism configured to transfer the hydraulic pressure generated by an operation of the brake pedal included in the driving operation elements 80 to the cylinder via a master cylinder as a backup. The brake device 210 is not limited to the above-described configuration and may be an electronically controlled hydraulic brake device configured to control an actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operation element 80 to change the direction of the steerable wheels.

One or more of modes A to C are examples of a "second driving mode" in the claims and one or more of modes C to E are examples of a "first driving mode" in the claims. Here, when mode C is the "second driving mode" in the claims, the "first driving mode" in the claims is either mode D or E. In the following description, as an example, it is assumed that the "second driving mode" in the claims is mode A or B and the "first driving mode" in the claims is mode C.

First Embodiment

[Control of Driving Mode]

Hereinafter, the control of the driving mode of the host vehicle M according to the number of signs around the host vehicle M will be described. In the following description, a case where traveling in mode A or B ends and the mode is changed to mode C when the host vehicle M is traveling in mode A or B will be described.

The recognizer 130 recognizes signs on a route along which the host vehicle M travels. The signs include road signs such as a regulatory sign, a warning sign, an instruction sign, an auxiliary sign, and a guide sign installed on the road and road-surface signs (road signs) such as a regulatory sign and an instruction sign drawn on the road surface. The recognizer 130 recognizes a sign existing within a range (a reference range) of a reference distance with respect to the host vehicle M on the route along which the host vehicle M travels.

Figure 4:
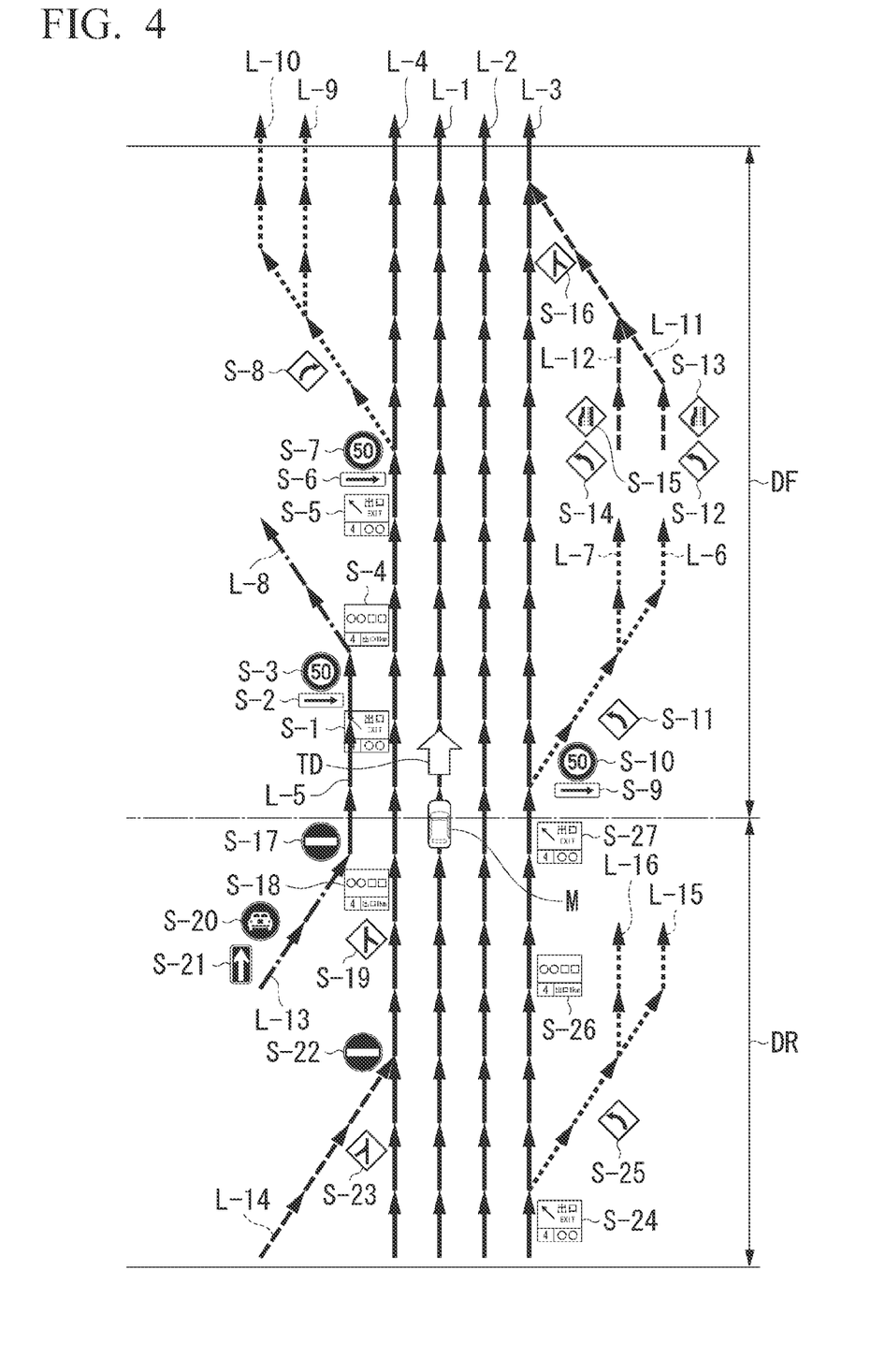
FIG. 4 is a diagram showing signs that are recognized by a recognizer according to a first embodiment.
Figure 5:
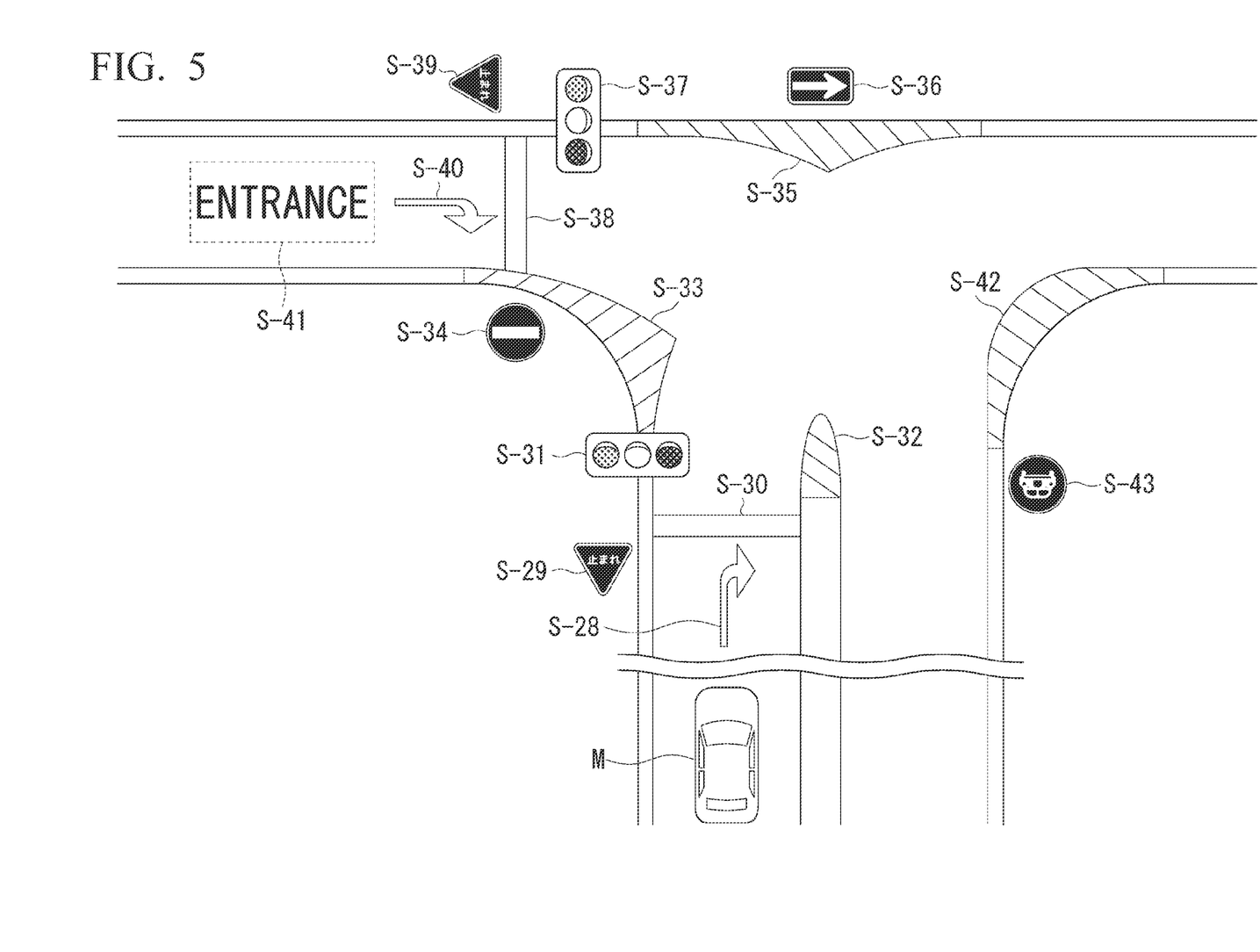
FIG. 5 is a diagram showing signs that are recognized by the recognizer according to the first embodiment.

FIGS. 4 and 5 are diagrams showing a sign recognized by the recognizer 130 according to the first embodiment.

FIG. 4 shows a scene in which the host vehicle M is traveling on a motorway. In FIG. 4, a series of continuous arrows indicate a lane. In the example of FIG. 4, lanes L-1 to L-5 are main lanes. Among these lanes, the lane L-1 is a traveling lane of the host vehicle M and the lanes L-2 to L-5 are main lanes in which traveling is possible in a direction that is the same as a traveling direction of the traveling lane. Lanes L-6 to L- and lanes L-15 and L-16 are branch lanes that will branch or have branched off from the main lane. Lanes L-11 to L-14 are merging lanes that will merge or have merged with the main lane. In this scene, the host vehicle M is traveling in the current traveling lane (the lane L-1) in a traveling direction TD. The recognizer 130 recognizes each of a sign S existing within a range of a forward reference distance DF in front of the host vehicle M and a sign S existing within a range of a rearward reference distance DR behind the host vehicle M. The forward reference distance DF is a distance longer than the rearward reference distance DR. For example, the forward reference distance DF and the rearward reference distance DR are both distances of about several hundred meters [m]. The recognizer 130 recognizes each sign S installed or drawn in the traveling lane, the main lane, the branch lane, and the merging lane. When the host vehicle M is at the position shown in FIG. 4, the recognizer 130 recognizes the signs S-1 to S-16 in the range of the forward reference distance DF and recognizes signs S-17 to S-27 in the range of the rearward reference distance DR.

FIG. 5 is a scene where the host vehicle M enters a T-shaped intersection. In FIG. 5, only the range of the forward reference distance DF at which the recognizer 130 recognizes the sign S is shown. When the host vehicle M is at the position shown in FIG. 5, the recognizer 130 recognizes signs S-28 to S-43 in the range of the forward reference distance DF.

The recognizer 130 outputs information about a recognized sign (hereinafter referred to as sign information) to the mode decider 150. The sign information includes at least information of the number of recognized signs S (hereinafter referred to as the number of signs). The sign information may include, for example, lane type information indicating a main lane, a branch lane, or a merging lane in which each recognized sign S is installed or drawn, sign position information indicating a positional relationship associated with the host vehicle M such as a range of either the forward reference distance DF or the rearward reference distance DR at which the sign S is present and a distance (which may include forward or rearward direction information) of each sign S from the position of the host vehicle M, and the like.

The mode decider 150 changes the driving mode of the host vehicle M on the basis of the sign information output by the recognizer 130. More specifically, the mode decider 150 determines whether or not the current driving mode of the host vehicle M is mode A or B and the number of signs included in the sign information exceeds a first reference value. The first reference value is, for example, a value indicating the number of signs in a range from several signs to several tens of signs. The first reference value may be a fixed value or may be defined in accordance with a situation in which the host vehicle M is currently traveling such as the number of lanes around the host vehicle M. The first reference value may be defined for each block of the second map information 62 to be referred to by the recommended lane decider 61 to decide on a recommended lane.

When the driving mode of the host vehicle M is mode A or B and the number of signs exceeds the first reference value, the mode decider 150 changes the current driving mode of the host vehicle M from mode A or B to mode C. Thereby, the driver performs forward monitoring and grips the steering wheel 82 when the number of signs exceeds the first reference value. Thereby, the driver can operate the steering wheel 82 by himself/herself even if there is a change in a surrounding environment.

The mode decider 150 may change the driving mode from mode A or B to mode D or E instead of changing the driving mode from mode A or B to mode C. In this case, the mode decider 150 may change the driving mode to mode D or E after temporarily changing the driving mode to mode C before the driving mode is changed from mode A or B to mode D or E.

The mode decider 150 may re-change the driving mode changed to mode C to mode A or B on condition that the number of signs included in the sign information output by the recognizer 130 is less than or equal to the first reference value. Thereby, the convenience of the host vehicle M can be improved. The mode decider 150 may be configured to prompt the driver to operate the HMI 30 as a condition for changing the driving mode from mode C to mode A or B. Thereby, it is possible to limit the disturbance of control due to the switching of the driving mode.

[Driving Mode Change Process]

Figure 6:
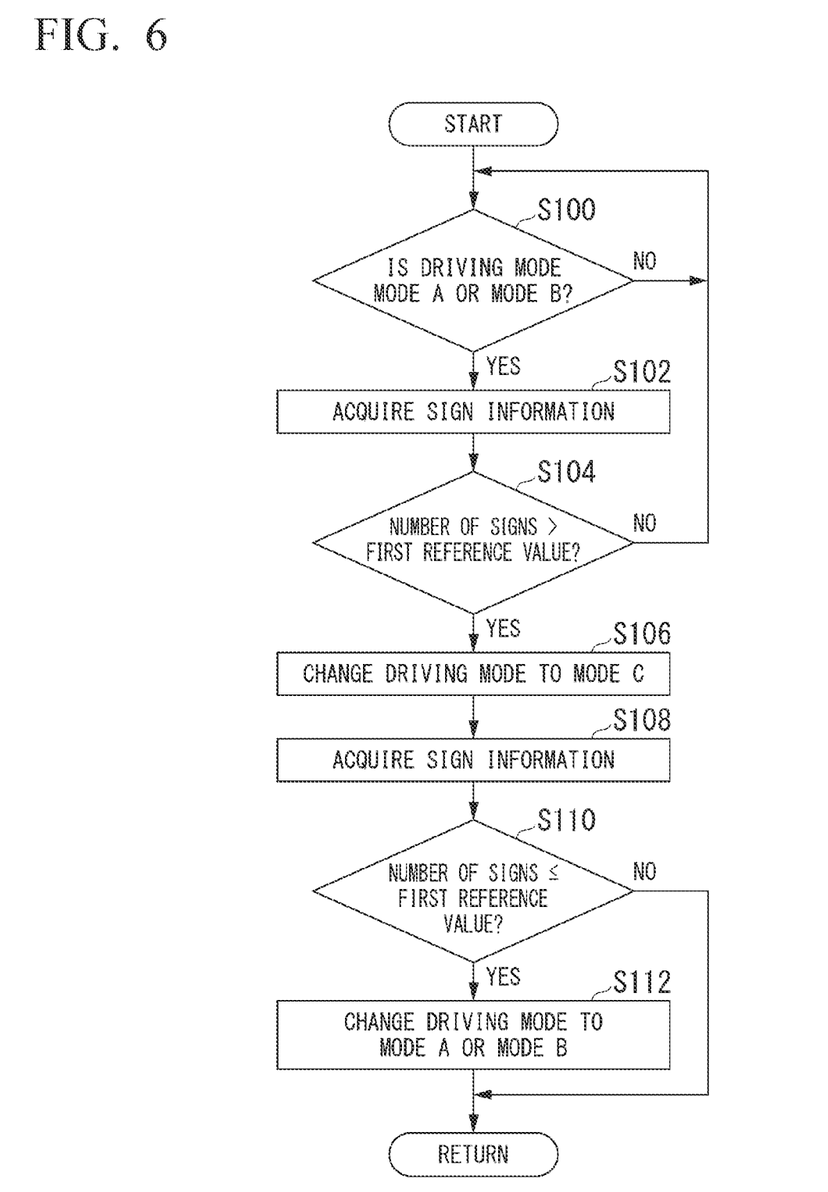
FIG. 6 is a flowchart showing an example of a flow of a process executed by a mode decider according to the first embodiment.

FIG. 6 is a flowchart showing an example of a flow of a process executed by the mode decider 150 according to the first embodiment. The change process of the present flowchart is iteratively executed, for example, while the automated driving control device 100 is operating.

First, the mode decider 150 determines whether or not the current driving mode of the host vehicle M is mode A or B (step S100). In step S100, if the current driving mode of the host vehicle M is not mode A or B, the mode decider 150 iterates the determination in step S100.

On the other hand, when it is determined that the current driving mode of the host vehicle M is mode A or B in step S100, the mode decider 150 acquires the sign information output by the recognizer 130 (step S102). The mode decider 150 determines whether or not the number of signs included in the acquired sign information exceeds the first reference value (step S104). When it is determined that the number of signs does not exceed the first reference value in step S104, the mode decider 150 returns the process to step S100.

On the other hand, when it is determined that the number of signs exceeds the first reference value in step S104, the mode decider 150 changes the driving mode of the host vehicle M to mode C (step S106).

Subsequently, the mode decider 150 re-acquires the sign information output by the recognizer 130 (step S108). The processing of step S108 may be performed when a prescribed period of time has elapsed after the driving mode of the host vehicle M was changed to mode C in the processing of step S106. The prescribed period of time is, for example, a period of time of about several seconds [sec] to several tens of seconds [sec]. The prescribed period of time may be, for example, a period of time until the number of signs recognized by the recognizer 130 becomes a different value.

Then, the mode decider 150 determines whether or not the number of signs included in the re-acquired sign information is less than or equal to the first reference value (step S110). When it is determined that the number of signs is not less than or equal to the first reference value in step S110, the mode decider 150 returns the process to step S100. That is, the mode decider 150 maintains the changed current traveling mode (mode C).

On the other hand, when it is determined that the number of signs is less than or equal to the first reference value in step S110, the mode decider 150 changes the driving mode of the host vehicle M to mode A or B (step S112) and returns the process to step S100.

According to the above-described process, when the current driving mode of the host vehicle M is mode A or B, the mode decider 150 changes the driving mode of the host vehicle M to mode C if the number of signs around the host vehicle M exceeds the first reference value. Thereby, it is possible to cope with a change in a surrounding environment in a state in which the driver performs forward monitoring and grips the steering wheel 82. As a result, the automated driving control device 100 can perform appropriate control according to a road structure.

In an example of the change process shown in FIG. 6, the driving mode of the host vehicle M is changed to mode C when the number of signs around the host vehicle M exceeds the first reference value. For example, the mode decider 150 may be configured to change the driving mode of the host vehicle M in two steps. In this case, for example, the mode decider 150 may be configured to change the driving mode of the host vehicle M from mode A or B to mode C as a first step when the number of signs around the host vehicle M exceeds a second reference value and further change the driving mode of the host vehicle M from mode C to mode D or E as a second step when the number of signs around the host vehicle M exceeds the first reference value. The second reference value is a value smaller than the first reference value. The second reference value is, for example, a value indicating the number of signs in a range from several signs to several tens of signs. Like the first reference value, the second reference value may be a fixed value, may be defined in accordance with a situation in which the host vehicle M is currently traveling such as the number of lanes around the host vehicle M, or may be defined for each block of the second map information 62. In this case, the sign recognition method of the recognizer 130, the process of the mode decider 150, and the like may be equivalent to the above-described example of the change process.

Second Embodiment

The mode decider 150 according to the first embodiment changes the driving mode of the host vehicle M to mode C on the basis of the number of signs recognized by the recognizer 130 when the host vehicle M is traveling in mode A or B. The mode decider 150 according to the second embodiment may be configured to determine whether or not a difference degree between the number of signs recognized by the recognizer 130 and the number of signs installed in the lane on the map indicated in the second map information 62 (hereinafter referred to as the number of signs on the map) satisfies a condition and change the driving mode to mode C when the difference degree does not satisfy the condition. The number of signs on the map is the number of signs indicated in the second map information 62 within the ranges of the forward reference distance DF and the rearward reference distance DR of the host vehicle M. In relation to the number of signs on the map, the mode decider 150 may acquire the second map information 62 within the ranges of the forward reference distance DF and the rearward reference distance DR from the MPU 60 and count the number of signs indicated in the second map information 62 that has been acquired. In relation to the number of signs on the map, the MPU 60 may count the number of signs indicated in the second map information 62 on the basis of information of the forward reference distance DF and the rearward reference distance DR output by the mode decider 150, and the recommended lane decider 61 may count the number of signs for each block when deciding on the recommended lane. The condition of the difference degree is defined by, for example, the difference between the number of signs and the number of signs on the map. The difference between the number of signs and the number of signs on the map may be a fixed value or may be a value different between a case where the other number is larger than one number serving as reference and a case where the other number is smaller than one number serving as the reference when either the number of signs or the number of signs on the map is designated as the reference. For example, when the number of signs is designated as the reference, the condition of the difference degree may be defined by each of an upper limit value when the number of signs on the map is larger and a lower limit value when the number of signs on the map is smaller. In this case, the mode decider 150 determines that the condition of the difference degree is satisfied if the difference between the number of signs and the number of signs on the map is between the upper limit value and the lower limit value and the condition of the difference degree is not satisfied if the number of signs on the map is larger than the number of signs by the upper limit value or more or if the number of signs on the map is smaller than the number of signs by the lower limit value or more. The same is also true when the number of signs on the map is designated as the reference.

The following example is considered as an event when the difference degree does not satisfy the condition. For example, when the information of the sign installed in the lane on the map indicated in the second map information 62 does not match the current state of the road due to a defect of the second map information 62, when it is difficult to recognize an actual sign due to a plant on a road shoulder, or the like, the number of signs on the map is larger than the number of signs (the number of signs recognized by the recognizer 130 is smaller than the number of signs on the map). For example, when the information of the sign installed in the lane on the map indicated in the second map information 62 does not match a current road state due to a defect of the second map information 62, when a new sign has been installed, or the like, the number of signs on the map is smaller than the number of signs (the number of signs recognized by the recognizer 130 is larger than the number of signs on the map). As the defect of the second map information 62, for example, factors such as the loss of information of the sign and the lack of map information of a region where the host vehicle M is traveling can be considered.

[Driving Mode Change Process]

Figure 7:
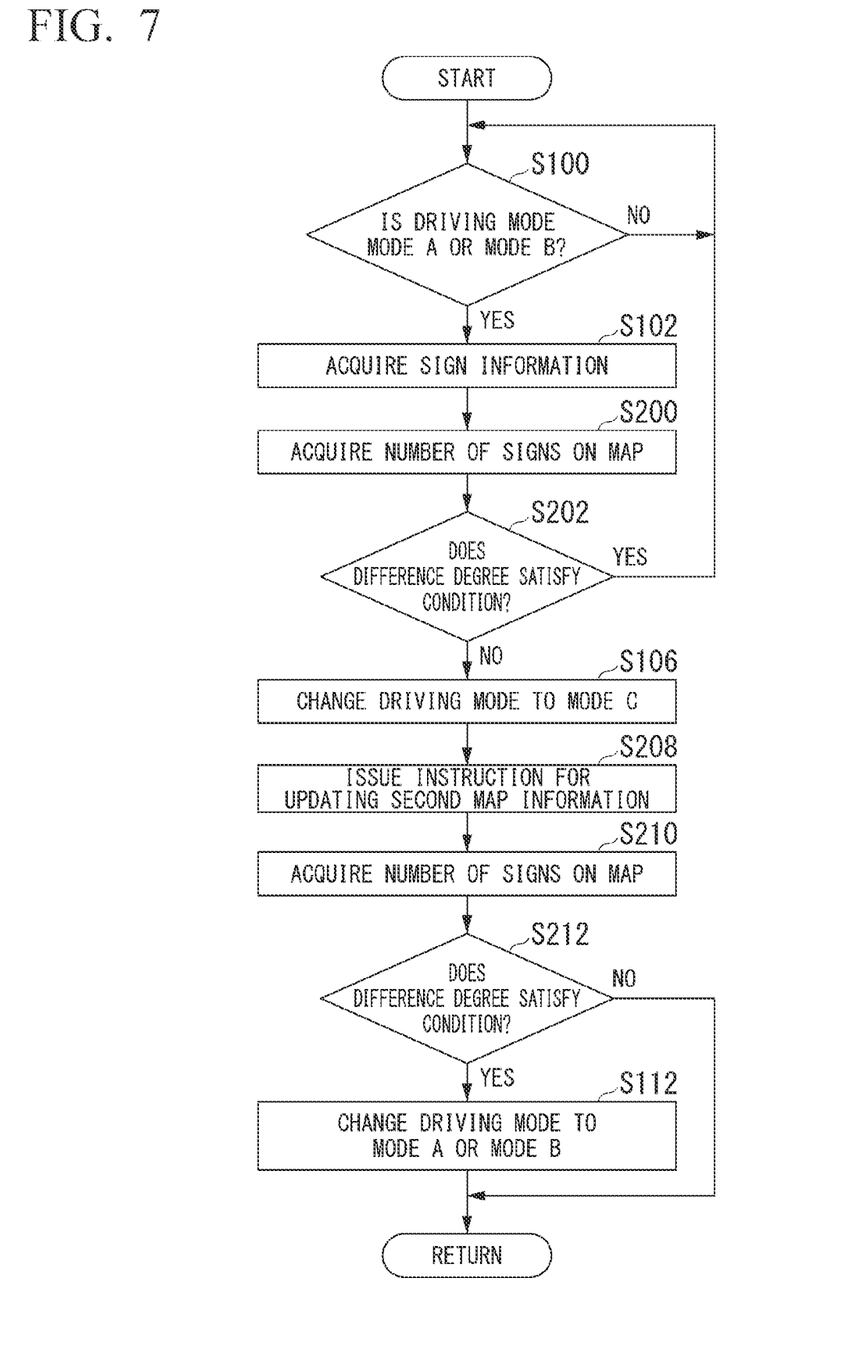
FIG. 7 is a flowchart showing an example of a flow of a process executed by the mode decider according to the first embodiment.

FIG. 7 is a flowchart showing an example of a flow of a process executed by the mode decider 150 according to the first embodiment. Like the change process of the first embodiment, the change process of the present flowchart is also iteratively executed, for example, while the automated driving control device 100 is operating. The present flowchart includes a process similar to the change process of the first embodiment. Accordingly, the same step number is assigned to the processing step similar to that of the change process of the first embodiment in the present flowchart and redundant description of the similar processing step will be omitted.

In the change process of the second embodiment, the mode decider 150 acquires sign information output by the recognizer 130 in step S102 when it is determined that the current driving mode of the host vehicle M is mode A or B in step S100.

Subsequently, the mode decider 150 acquires the number of signs on the map (step S200). The mode decider 150 determines whether or not a difference degree between the number of signs included in the acquired sign information and the acquired number of signs on the map satisfies a condition (step S202). When it is determined that the difference degree between the number of signs and the number of signs on the map satisfies the condition in step S202, the mode decider 150 returns the process to step S100.

On the other hand, when it is determined that the difference degree between the number of signs and the number of signs on the map does not satisfy the condition in step S202, the mode decider 150 changes the driving mode of the host vehicle M to mode C (step S106).

The mode decider 150 instructs the MPU 60 to update the second map information 62 (step S208). In response to the instruction in step S208, the MPU 60 causes the communication device 20 to communicate with another device and updates the second map information 62. Thereby, in the vehicle system 1, for example, it is possible to avoid a case where the information of the sign installed in the lane on the map indicated in the second map information 62 does not match the current road state due to a defect of the second map information 62. The MPU 60 and the communication device are examples of a "high-precision map information acquirer" in the claims.

Subsequently, the mode decider 150 re-acquires the number of signs on the map (step S210). This processing of step S210 may be performed when a prescribed period of time has elapsed after the MPU 60 was instructed to update the second map information 62 in the processing of step S208. The prescribed period of time is, for example, a period of time of about several seconds [sec] to several tens of seconds [sec]. The prescribed period of time may be, for example, a period of time until the second map information 62 is updated by the MPU 60.

The mode decider 150 determines whether or not the difference degree between the number of signs included in the acquired sign information and the re-acquired number of signs on the map satisfies the condition (step S212). When it is determined that the difference degree between the number of signs and the number of signs on the map does not satisfy the condition in step S212, the mode decider 150 returns the process to step S100. That is, the mode decider 150 maintains the changed current traveling mode (mode C).

On the other hand, when it is determined that the difference degree between the number of signs and the number of signs on the map satisfies the condition in step S212, the mode decider 150 changes the driving mode of the host vehicle M to mode A or B as in the change process of the first embodiment (step S112) and returns the process to step S100.

In the above-described process, the mode decider 150 of the second embodiment changes the driving mode of the host vehicle M to mode C if the difference degree between the number of signs and the number of signs on the map does not satisfy the condition when the current driving mode of the host vehicle M is mode A or B. Thereby, as in the change process of the first embodiment, it is possible to cope with a change in a surrounding environment in a state in which the driver performs forward monitoring and grips the steering wheel 82. As a result, the automated driving control device 100 according to the second embodiment can perform appropriate control according to a road structure as in the first embodiment.

In the change process of the second embodiment, the MPU 60 is instructed to update the second map information 62 in the processing of step S208. An operation of instructing the MPU 60 to update the second map information 62 may be performed in the change process of the first embodiment. The mode decider 150 may be configured to update the first reference value on the basis of the MPU 60 that has been updated after the MPU 60 updates the second map information 62 in response to the instruction. In this case, the mode decider 150 can perform the processing of step S110 in the change process of the first embodiment using the updated first reference value.

As described above, according to the automated driving control device 100 of the embodiment, the recognizer 130 recognizes signs installed on a nearby road including a route along which the host vehicle M travels. In the automated driving control device 100 of the embodiment, the mode decider 150 changes the driving mode of the host vehicle M on the basis of information of the signs recognized by the recognizer 130 when the current driving mode of the host vehicle M is the mode A or B. Thereby, the automated driving control device 100 of the embodiment can perform appropriate control according to a road structure.

The embodiment described above can be represented as follows.

A vehicle control device including:
a storage device storing a program; and
a hardware processor,
wherein the hardware processor executes the program stored in the storage device to:
recognize a surrounding situation of the vehicle;
control steering and acceleration/deceleration of the vehicle independently of an operation of a driver of the vehicle;
decide on any one of a plurality of driving modes including a first driving mode and a second driving mode as a driving mode of the vehicle, the second driving mode being a driving mode in which a task imposed on the driver is milder than that in the first driving mode, some of the plurality of driving modes including at least the second driving mode being performed by controlling the steering and the acceleration/deceleration of the vehicle independently of the operation of the driver of the vehicle;
change the driving mode of the vehicle to a driving mode in which a task is severer when a task associated with the decided driving mode is not executed by the driver;
recognize a sign existing within a reference range of a route along which the vehicle travels at the time of recognition; and
change the driving mode of the vehicle from the second driving mode to the first driving mode when the driving mode of the vehicle is the second driving mode and when the number of recognized signs exceeds a first reference value.

Although modes for carrying out the present invention have been described using embodiments, the present invention is not limited to the embodiments, and various modifications and substitutions can also be made without departing from the scope and spirit of the present invention.

REFERENCE SIGNS LIST

1 Vehicle system
10 Camera
12 Radar device
14 LIDAR sensor
16 Physical object recognition device
40 Vehicle sensor
60 MPU
61 Recommended lane decider
62 Second map information
70 Driver monitor camera
80 Driving operation elements
82 Steering wheel
84 Steering grip sensor
100 Automated driving control device
120 First controller
130 recognizer
140 Action plan generator
150 Mode decider
152 Driver state determiner
154 Mode change processor
160 Second controller

What is claim is:

1. A vehicle control device comprising:
a processor; and
a memory that stores a program that, when executed by the processor, facilitate performance of the program comprising:
recognizing a surrounding situation of a vehicle;
controlling steering and acceleration/deceleration of the vehicle independently of an operation of a driver of the vehicle;
deciding on any one of a plurality of driving modes, including a first driving mode and a second driving mode, as a driving mode of the vehicle, resulting in a decided driving mode, and
changing the driving mode of the vehicle from the decided driving mode to a driving mode in which a number of tasks imposed on the driver is more than the number of tasks imposed on the driver in the decided driving mode when a task associated with the decided driving mode is not executed by the driver, the second driving mode being a driving mode in which the number of tasks imposed on the driver is less than the number of tasks imposed on the driver in the first driving mode, some of the plurality of driving modes including at least the second driving mode being controlled by a driving controller,
when a sign existing within a reference range of a route along which the vehicle travels is recognized, the performance of the program further comprises:
based on the driving mode of the vehicle being the second driving mode and based on a first determination that a number of signs recognized exceeds a first reference value, changing the driving mode of the vehicle from the second driving mode to the first driving mode, and
based on the driving mode of the vehicle being the second driving mode and based on a second determination that a difference degree between the number of signs recognized and the number of signs installed in a lane on a map within the reference range indicated in high-precision map information does not satisfy a condition, changing the driving mode in the driving controller from the second driving mode to the first driving mode.

2. The vehicle control device according to claim 1, wherein the performance of the program further comprises acquiring new map information when the difference degree associated with the number of signs does not satisfy the condition.

3. The vehicle control device according to claim 1, wherein the reference range includes a range from the vehicle to a forward reference distance in a forward direction and a range from the vehicle to a rearward reference distance in a rearward direction.

4. The vehicle control device according to claim 3, wherein the forward reference distance is longer than the rearward reference distance.

5. The vehicle control device according to claim 1, wherein the performance of the program further comprises recognizing a sign installed at a position higher than a road surface of the route and/or a sign drawn on the road surface.

6. The vehicle control device according to claim 1,
wherein the second driving mode is a driving mode in which at least a task of gripping an operation element for receiving a steering operation is not imposed on the driver, and
wherein the first driving mode is a driving mode in which a driving operation by the driver is required in relation to at least one of the steering and the acceleration/deceleration of the vehicle or a driving mode in which the task of gripping the operation element is imposed on the driver.

7. A vehicle control device comprising:
a processor; and
a memory that stores a program that, when executed by the processor, facilitate performance of the program comprising:
recognizing a surrounding situation of a vehicle;
controlling steering and acceleration/deceleration of the vehicle independently of an operation of a driver of the vehicle; and
deciding on any one of a plurality of driving modes, including a first driving mode and a second driving mode, as a driving mode of the vehicle, resulting in a decided driving mode, and
changing the driving mode of the vehicle from the decided driving mode to a driving mode in which a number of tasks imposed on the driver is more than the number of tasks imposed on the driver in the decided driving mode when a task associated with the decided driving mode is not executed by the driver, the second driving mode being a driving mode in which the number of tasks imposed on the driver is less than the number of tasks imposed on the driver in the first driving mode, some of the plurality of driving modes including at least the second driving mode being controlled by a driving controller,
when a sign existing within a reference range of a route along which the vehicle travels is recognized, the performance of the program further comprises:
based on the driving mode of the vehicle being the second driving mode and based on a first determination that a number of signs recognized by the recognizer exceeds a first reference value, changing the driving mode of the vehicle from the second driving mode to the first driving mode, and
wherein the first reference value is updated when map information including at least information of a position of a sign installed in a lane on a map has been updated.

8. A vehicle control method comprising:
recognizing, by a computer mounted in a vehicle, a surrounding situation of the vehicle;
controlling, by the computer, steering and acceleration/deceleration of the vehicle independently of an operation of a driver of the vehicle;
deciding, by the computer, on any one of a plurality of driving modes, including a first driving mode and a second driving mode, as a driving mode of the vehicle, resulting in a decided driving mode, the second driving mode being a driving mode in which a number of tasks imposed on the driver is less than the number of tasks imposed on the driver in the first driving mode, some of the plurality of driving modes including at least the second driving mode being performed by controlling the steering and the acceleration/deceleration of the vehicle independently of the operation of the driver of the vehicle;
changing, by the computer, the driving mode of the vehicle from the decided driving mode to a driving mode in which the number of tasks imposed on the driver is more than the number of tasks imposed on the driver in the decided driving mode when a task associated with the decided driving mode is not executed by the driver;
recognizing, by the computer, a sign existing within a reference range of a route along which the vehicle travels at the time of recognition;
based on the driving mode of the vehicle being the second driving mode and based on a first determination that a number of recognized signs exceeds a first reference value, changing, by the computer, the driving mode of the vehicle from the second driving mode to the first driving mode, and
based on the driving mode of the vehicle being the second driving mode and based on a second determination that a difference degree between the number of recognized signs and a number of signs installed in a lane on a map of the reference range indicated in map information including sign information does not satisfy a condition, changing, by the computer, the driving mode from the second driving mode to the first driving mode.

* * * * *